No. 744,060. PATENTED NOV. 17, 1903.
J. FRYE.
SIEVE OR STRAINER.
APPLICATION FILED MAR. 20, 1903.
NO MODEL.

Witnesses. Inventor:

No. 744,060. Patented November 17, 1903.

UNITED STATES PATENT OFFICE.

JAMES FRYE, OF TORONTO, CANADA.

SIEVE OR STRAINER.

SPECIFICATION forming part of Letters Patent No. 744,060, dated November 17, 1903.

Application filed March 20, 1903. Serial No. 148,784. (No model.)

*To all whom it may concern:*

Be it known that I, JAMES FRYE, of the city of Toronto, in the county of York, in the Province of Ontario, Canada, have invented certain new and useful Improvements in Sieves or Strainers, of which the following is a specification.

My invention relates to improvements in sieves or strainers; and the object of the invention is to devise a strainer which may be utilized both as a strainer and funnel and when utilized as a strainer may have the size of the holes varied according to the work it is intended to perform; and it consists, essentially, of a strainer conical in shape and provided with a suitable handle and having an internal supplemental straining-cone fitting therein and adjustably held in position circumferentially within the main strainer, the bottom of the strainer being open and provided with a suitable screw-cap and the parts being otherwise arranged and constructed in detail as hereinafter more particularly explained.

Figure 1:
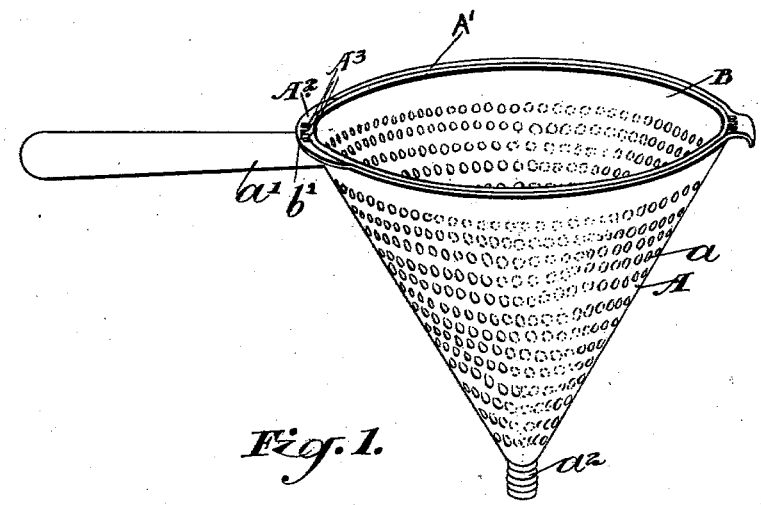
Figure 2:
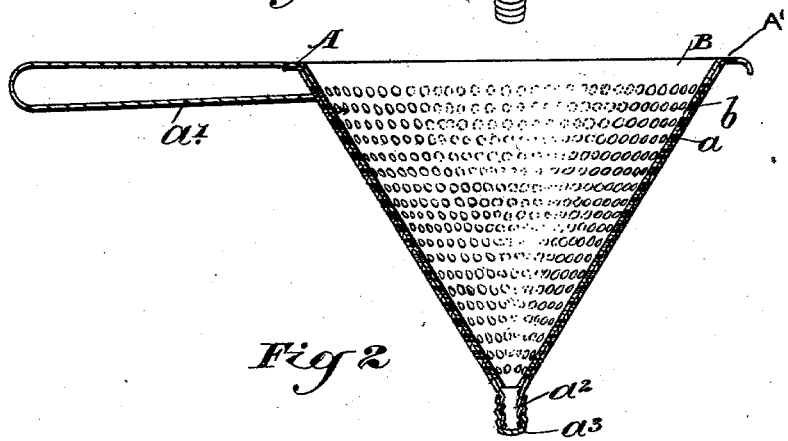
Figure 3:
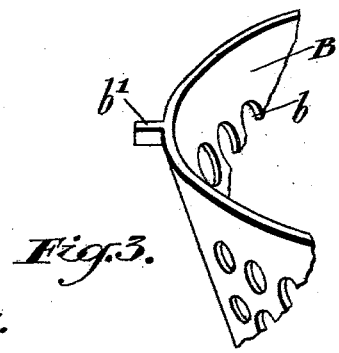

Figure 1 is a perspective view of my strainer complete. Fig. 2 is a vertical section through the strainer. Fig. 3 is an enlarged detail showing the preferred means for holding the internal straining-cone in position.

In the drawings like letters of reference indicate corresponding parts in each figure.

A is the main conical body of the strainer, which is provided with suitable perforations $a$, a handle $a'$, and an open-ended spout $a^2$ at the bottom, which is provided with a suitable screw-cap $a^3$. The upper rim A' is provided with enlargements $A^2$, in which are located radially-extending recesses $A^3$, extending from the inner edge outwardly.

B is the supplemental straining-cone, which is provided with perforations $b$, corresponding in size and location relatively to the perforations $a$ in the main straining-body A.

The supplemental straining-cone B is provided with a lug $b'$ at each end, and this lug is designed to fit into one or the other of the recesses $A^3$, it being of course understood that when it fits into one end recess all the holes or perforations $b$ register with the holes or perforations $a$, and when it fits into the next adjacent recess the holes $a$ are partially covered by the slight turning of the supplemental straining-cone, and when the lug $b'$ fits into the third recess all the holes $a$ are covered.

Of course there may be as many recesses $A^3$ as may be desired, so as to vary the size of the holes to any extent desired; but as my device is adapted to be used as a cooking utensil for the most part it is generally sufficient to provide only one variation in the size of the holes.

When the holes $a$ are covered, as hereinbefore described, the strainer may be used as a funnel, the cap $a^3$ then being removed in order to allow of the passage of the liquid through the bottom.

From this description the utility of my device will be readily understood.

What I claim as my invention is—

1. In a strainer or sieve, the combination with the main body of the strainer provided with perforations, of the supplemental body or lining provided with perforations correspondingly relatively located, means for holding the internal body, so that the perforations thereof extend between the perforations of the outer body, so that the latter perforations are closed, an orifice at the bottom of the outer body and a cap for closing said orifice as and for the purpose specified.

2. In a strainer or sieve, the combination with the outer body having perforations, and a rim having recesses formed therein, of the inner body having perforations and a projection designed to fit into one or other of the said recesses as and for the purpose specified.

3. In a strainer, the combination with the outer body having perforations and a rim having recesses formed therein, of the inner body having perforations and a projection designed to fit into one or other of the said recesses, and a screw-cap designed to close the bottom orifice of the funnel as and for the purpose specified.

JAMES FRYE.

Witnesses:
B. BOYD,
M. MCLAREN.